Aug. 23, 1932.  H. STEINHART ET AL  1,873,909
SWITCH CONTROL MEANS FOR VEHICLE LAMPS
Filed Nov. 5, 1929  2 Sheets-Sheet 1
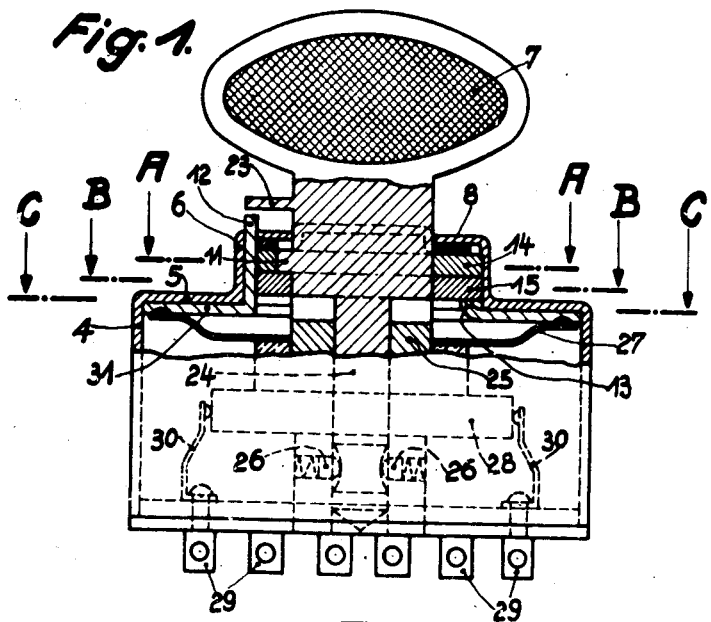
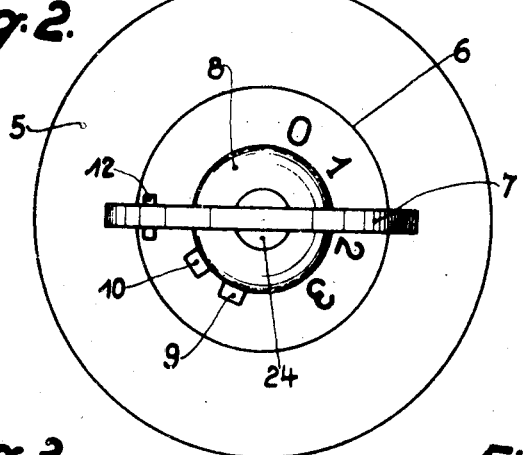
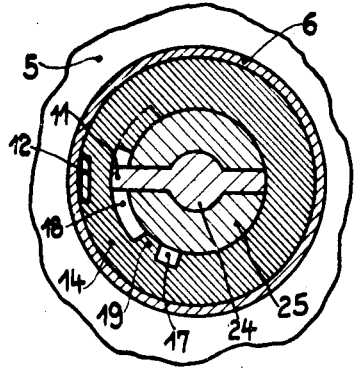
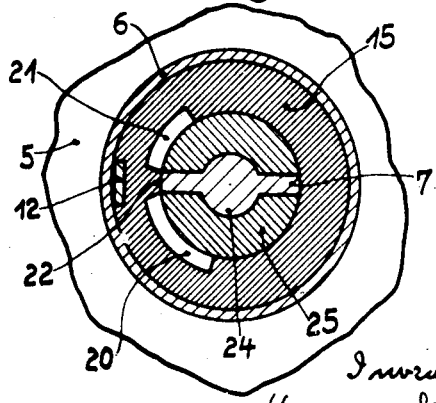
Inventors
Hermann Steinhart
Heinrich Arnold
by Steward & McKay
their attorneys Aug. 23, 1932.  H. STEINHART ET AL  1,873,909
SWITCH CONTROL MEANS FOR VEHICLE LAMPS
Filed Nov. 5, 1929   2 Sheets-Sheet 2
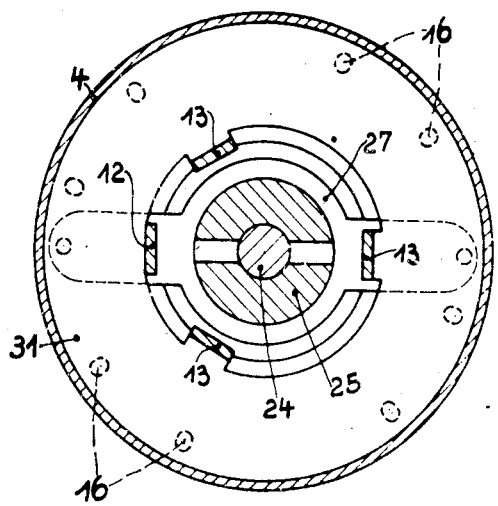
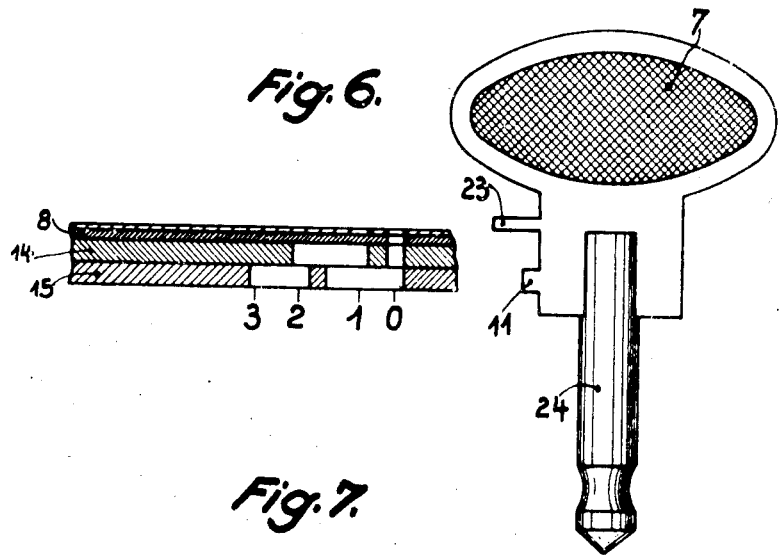
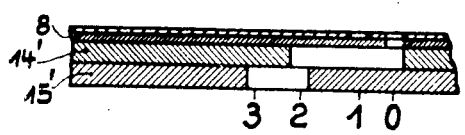
Inventors
Hermann Steinhart
Heinrich Arnold
by Steward + McKay
their attorneys Patented Aug. 23, 1932

1,873,909

UNITED STATES PATENT OFFICE

HERMANN STEINHART, OF STUTTGART, AND HEINRICH ARNOLD, OF WAIBLINGEN, GERMANY, ASSIGNORS TO ROBERT BOSCH AKTIENGESELLSCHAFT, OF STUTTGART, GERMANY

SWITCH CONTROL MEANS FOR VEHICLE LAMPS

Application filed November 5, 1929, Serial No. 405,015, and in Germany November 12, 1928.

The present invention relates to switch control means for vehicle lamps.

The usual switches for the lighting installation of vehicles have series of switch positions, for instance, a position 0 when all lamps are switched off, a position 1 when the side and rear lamps are lit, a position 2 for headlight dimming, and a position 3 when all lights are on.

In order that the switch cannot be accidentally rotated right up to the position 1, when changing from the position 3 to the dimming position 2, a stop is provided between the positions 1 and 2.

In a known construction a bolt, longitudinally displaceable at will is provided in the switch handle and co-operates with a stop, but only strikes against this in its lower position, and not, however, in its upper position. This construction has the disadvantage that the driver may easily forget to replace the bolt in its lower stop position after moving it from position 1 to position 2 when it must be pushed upwards. As a result, the stop is inoperative, and has failed in its purpose. This drawback is avoided in the present invention since the key comes out of reach of the stop, while being displaced in its longitudinal direction. This displacement is always necessary if it is desired to change from position 1 to 2 and vice versa and cannot therefore, be accidentally omitted.

One form of construction of the invention is illustrated by way of example in the accompanying drawings in which:

Figure 1 shows a partial longitudinal section of a switch box.

Figure 2 a corresponding plan view.

Figure 3 a cross-section on the lines A—A of Figure 1.

Figure 4 a cross-section on the lines B—B of Figure 1.

Figure 5 a cross-section on the lines C—C of Figure 1.

Figure 6 is a devleopment of the switch path together with the switch key.

Figure 7 is a development of the switch path of a modified form of construction.

The switch box has a casing 4 on the front wall 5 of which is formed a neck 6, which is closed in front by a transverse slotted disc 8 and a switch key 7 which extends into the casing. On the front of the neck 6 are indications 0, 1, 2, and 3 corresponding to positions on the switch key for driving, all lamps out, side and rear lamps on, headlights dimmed and all lights fully on. On the inner circumference of the neck 6 are two grooves 9 and 10, through which the key, together with its ward 11, can be inserted and withdrawn from the positions 0 and 1.

On the rear side of the wall 5 is firmly secured a disc 31 which retains two guide discs 14 and 15 in position in the neck 6 by means of bent-over flaps 12 and 13 and which is provided with notches 16 corresponding to the positions 0, 1, 2, and 3. The guide disc 14 has a small recess 17 and a curved recess 18, which are separated by a stop 19. In the inner circumference of the guide disc 15 are two curved recesses 20 and 21, which are separated by a stop 22. Further the discs 14 and 15 have a small groove on their periphery, through which a right-angled flap 12 extends. The flap 12 secures the discs 14 and 15 against rotation, and passes out through an opening on the front side of the neck so that it forms a formal stop for a projection 23 on the key 7.

The key 7 extends downwardly as a pin 24, which is received in a slotted bearing 25, bored longitudinally, and is axially secured in position by spring pins 26. A checking spring 27, the heads of which co-operate with the notches 16, and a switch roller 28, engaging closed contact springs 30, of terminals 29, are secured to the switch axle 25. The switch mechanism can be modified in any suitable manner, and is, therefore, only drawn in dotted lines.

The switch box is used in the following manner. In the switch position 0, i. e. when driving by day, the key 7 and the disc 8 rotatable therewith, is so positioned that the ward 11 can be withdrawn from and inserted in the groove 9. When inserting the key, the ward passes through the groove 9 and the recess 17 of the guide disc 14 into the recess 20 of the guide disc 15, whereby the longitudinal displacement of the key is limited by striking of the projection 23 against the front edge of the neck 6. By this the key sits in the switch bearing 25, and carries this with it when being rotated with the checking spring 27, and the switch roller 28, the checking spring 27, and the notches 16 governing the positions 0, 1, 2 and 3.

When changing over from position 0 to position 1 the key is rotated towards the number 1, until it rests above it. The key ward 11 can now move freely in the space 20. By reason of the groove 10 the key can be withdrawn from this position and later re-inserted.

If it is desired to operate the key from the position 1 towards the position 2 then the key ward abuts against the stop 22 of the guide disc 15, at the same time the projection 23 rests in front of the flap 12 projecting from the neck 6, so that the key must axially withdraw to a considerable extent for further rotation. In being drawn out the key fits in the space 18 of the guide disc 14 and can be further rotated therein until the ward 11 abuts against the end of the groove 18. Then the key is again moved downwardly until the ward 11 lies within the recess 21 of the guide disc 15 and is then in position 2 for dimming.

In order to change over into position 3 it is only necessary to rotate the key further until it comes to rest over the number 3. With this the key ward 11 abuts against the end of the groove 21. If it is now desired to dim the headlights, then it is only necessary to rotate the key back to the position 2, where the key ward 11 abuts against the stop 22, which prevents further rotation.

The key can therefore be turned backwards and forwards as quickly as desired between the positions 2 and 3 without rotating into another switch position being possible.

The change back from position 1 to 2 is effected through pulling out, turning back and pressing down the key.

If the ignition key is embodied in a known manner in the switch key, then care must be taken that the ignition current circuit is not influenced by the short longitudinal displacement of the key during movement past the stop 22. Modification of this kind does not however offer any difficulties.

Figure 7 illustrates a simplified construction. Each of the guide discs 14' and 15' has only one curved recess on its inner circumference and by a longitudinal displacement of the key in the switch position 2 it passes from the upper recess to the lower and vice versa.

What I claim is:

1. Switch control means for vehicle lamps comprising a casing, a rotatable switch member mounted in said casing and adapted to assume a plurality of positions corresponding to different conditions of illumination of said lamps, a key adapted to be inserted in said casing to engage and operate said switch member, a ward on said key, and means within said housing cooperating with said ward to prevent the movement of said switch member from one position to another without first axially moving said key.

2. Switch control means for vehicle lamps comprising a casing, a rotatable switch member mounted in said casing and adapted to assume a plurality of positions corresponding to off, dim and full light conditions of said lamps, a key adapted to be inserted in said casing to engage and operate said switch member, a ward on said key, means cooperating with said ward to permit the insertion and removal of said key at said off position and means within said casing cooperating with said ward to prevent the movement of said key from dimming position to off position without first axially displacing said key.

3. Switch control means for vehicle lamps comprising a casing, a single switch member adapted to occupy at least three positions corresponding to different conditions of illumination of said lamps, a key adapted to be inserted in said casing to engage and operate said switch member, a ward on said key, said member being freely movable between two of said positions by said key and means within said housing cooperating with said ward to prevent movement of said member to the third position without first axially displacing said key.

4. Switch control means for vehicle lamps comprising a casing, a single switch element movable in one direction to at least two different positions from the initial position, a key adapted to be inserted in said casing at said initial position to engage and operate said switch member, a ward on said key, said member being freely movable between said two positions by said key, and means cooperating with said ward to prevent said key from being returned to the initial position without first axially displacing said key.

5. Switch control means for vehicle lamps comprising a casing, a single switch member adapted to occupy at least three positions corresponding to different conditions of illumination of said lamps, a key adapted to be inserted in said casing to engage and operate said switch member, a ward on said key, said member being freely movable between two of said positions by said key, means within said housing cooperating with said ward to prevent movement of said member to the third position without first axially displacing said key, and means external of said casing for indicating the angular position of the key at which such axial displacement is necessary.

In testimony whereof we have hereunto affixed our signatures.

HERMANN STEINHART.
HEINRICH ARNOLD.